(12) United States Patent
Naruke

(10) Patent No.: US 11,764,424 B2
(45) Date of Patent: Sep. 19, 2023

(54) BATTERY PACK COOLING SYSTEM

(71) Applicant: SUBARU CORPORATION, Tokyo (JP)

(72) Inventor: Toshiaki Naruke, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 43 days.

(21) Appl. No.: 17/388,317

(22) Filed: Jul. 29, 2021

(65) Prior Publication Data

US 2022/0069381 A1 Mar. 3, 2022

(30) Foreign Application Priority Data

Aug. 25, 2020 (JP) ................................ 2020-141941

(51) Int. Cl.
*H01M 10/6556* (2014.01)
*H01M 10/613* (2014.01)
*H01M 10/625* (2014.01)
*H01M 10/6568* (2014.01)

(52) U.S. Cl.
CPC ..... *H01M 10/6556* (2015.04); *H01M 10/613* (2015.04); *H01M 10/625* (2015.04); *H01M 10/6568* (2015.04); *H01M 2220/20* (2013.01)

(58) Field of Classification Search
CPC ............. H01M 10/613; H01M 10/625; H01M 10/635; H01M 10/6556; H01M 10/6567; H01M 10/6568; H01M 10/658; H01M 2220/20; H01M 50/204; H01M 50/691; Y02E 60/10
See application file for complete search history.

(56) References Cited

FOREIGN PATENT DOCUMENTS

| JP | 2010-129392 A | | 6/2010 | |
|----|---------------|---|--------|---|
| JP | 2012-94376 A | | 5/2012 | |
| JP | 2015022905 A | * | 2/2015 | ............ H01M 10/60 |

OTHER PUBLICATIONS

Machine translation JP2015022905A (Year: 2015).*

* cited by examiner

*Primary Examiner* — Victoria H Lynch
(74) *Attorney, Agent, or Firm* — Smith, Gambrell & Russell, LLP

(57) ABSTRACT

A battery pack cooling system includes a battery pack case, a cooling fluid passage, a cooling medium passage and a water absorber. The battery pack case houses a battery module. The cooling fluid passage is disposed in a vicinity of the battery module. Cooling fluid for cooling the battery module is to flow through the cooling fluid passage. The cooling medium passage is configured to exchange heat with the cooling fluid. The cooling medium passage is disposed so as to be exposed to a space in the battery pack case. Cooling medium is to flow through the cooling medium passage. The water absorber is made of a water absorbable material. The water absorber is configured to absorb water that is condensed on the cooling medium passage.

23 Claims, 4 Drawing Sheets

BATTERY PACK COOLING SYSTEM

CROSS-REFERENCE TO RELATED APPLICATIONS

The present application claims priority from Japanese Patent Application No. 2020-141941 filed on Aug. 25, 2020, the entire contents of which are hereby incorporated by reference.

BACKGROUND

The disclosure relates to a battery pack cooling system, and in particular, relates to a battery pack cooling system that cools a battery module by using cooling fluid and cooling medium.

Electric vehicles are mounted with a storage battery that stores electric power for traveling. This storage battery is temperature-regulated in such a manner that the temperature is maintained in a certain temperature range. That is, the temperature of the storage battery is increased so as to not become the lower limit temperature or lower and is decreased so as to not become the upper limit temperature or higher. In addition, the output from the storage battery may be restricted depending on the temperature state of the storage battery.

With respect to a battery mounted on a vehicle, water condensation may occur in the battery or constituent devices disposed in the vicinity of the battery. The following Japanese Unexamined Patent Applications Publication (JP-A) Nos. 2010-129392 and 2012-94376 disclose techniques for dealing with such water condensation.

SUMMARY

An aspect of the disclosure provides a battery pack cooling system including a battery pack case, a cooling fluid passage, a cooling medium passage and a water absorber. The battery pack case houses a battery module. The cooling fluid passage is disposed in a vicinity of the battery module. Cooling fluid for cooling the battery module is to flow through the cooling fluid passage. The cooling medium passage is configured to exchange heat with the cooling fluid. The cooling medium passage is disposed so as to be exposed to a space in the battery pack case. Cooling medium is to flow through the cooling medium passage. The water absorber is made of a water absorbable material. The water absorber is configured to absorb water that is condensed on the cooling medium passage.

BRIEF DESCRIPTION OF THE DRAWINGS

The accompanying drawings are included to provide a further understanding of the disclosure and are incorporated in and constitute a part of this specification. The drawings illustrate an example embodiment, and, together with the specification, serve to explain the principles of the disclosure.

FIG. 4A is a sectional view, and FIG. 4B is a perspective view illustrating simply a cooling fluid passage and a cooling medium passage.

DETAILED DESCRIPTION

The techniques disclosed in JP-A Nos. 2010-129392 and 2012-94376 involve methods for dealing with moisture that is generated in regulating temperature of the battery, but these methods are desired to be improved.

For example, the technique disclosed in JP-A No. 2010-129392 includes absorbing condensed water by use of a water absorbing layer, but moisture that is generated in a space for containing the battery is not studied. On the other hand, the technique disclosed in JP-A No. 2012-94376 uses a water guide passage for collecting condensed water, and therefore, measures against the condensed water are complicated, causing further increase in cost.

It is desirable to provide a battery pack cooling system that effectively cools a battery module by using cooling fluid and cooling medium.

Hereinafter, a battery pack cooling system 16 according to an embodiment of the disclosure will be described in detail based on the drawings. The following description uses each of a front-rear direction, an upper-lower direction, and a right-left direction, assuming that the right-left direction is a direction of a vehicle 10 as viewed from a rear side. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
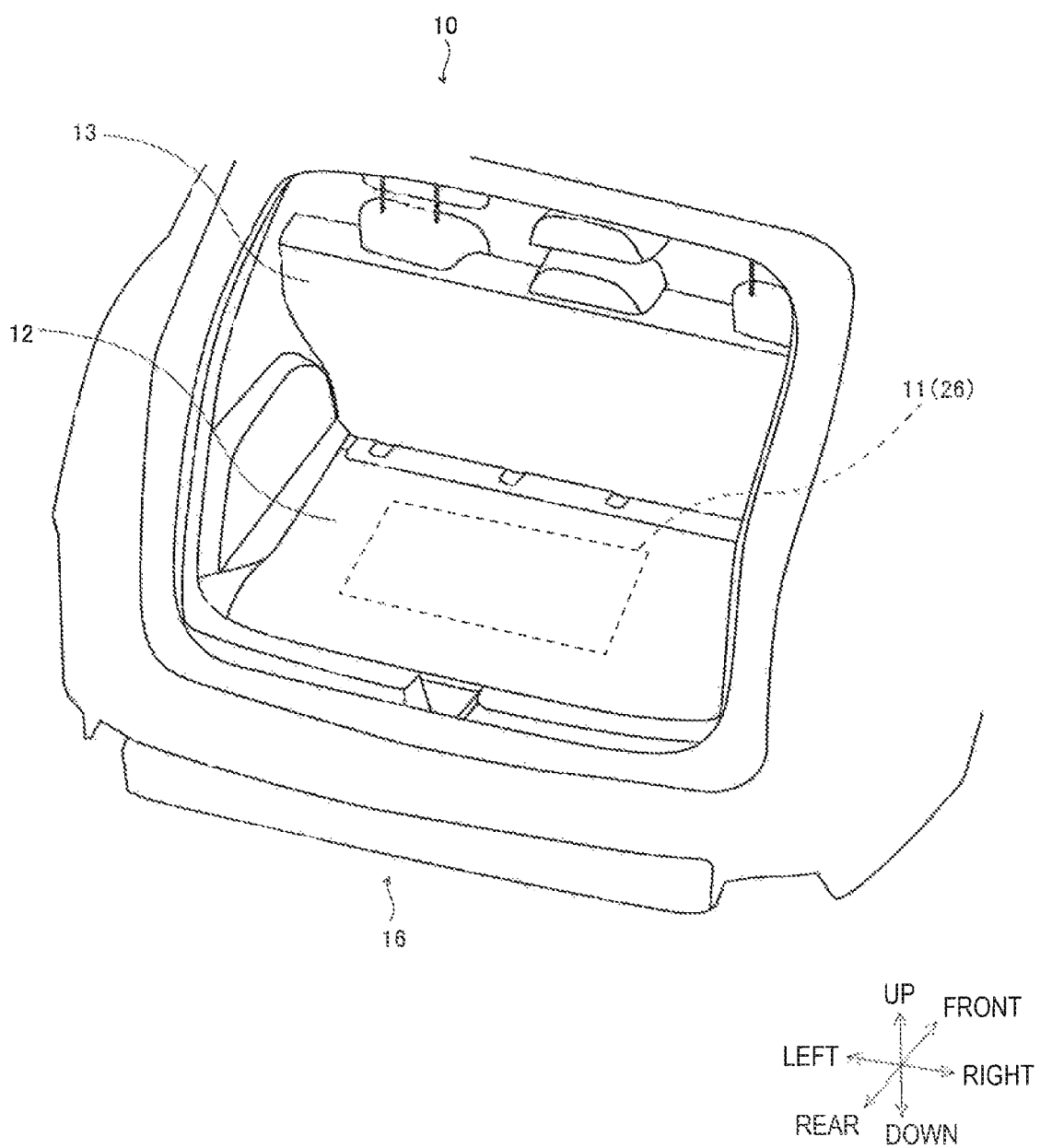
FIG. 1 is a perspective view illustrating a vehicle that has a battery pack cooling system according to an embodiment of the disclosure.

FIG. 1 is a perspective view illustrating the vehicle 10 including the battery pack cooling system 16. The vehicle 10, which is an automobile, a train, or the like, is mounted with a battery pack 26 for supplying power to a motor and various electric components. The vehicle 10 is, for example, an electrical vehicle (EV), a hybrid electrical vehicle (HEV), or a plug-in hybrid electrical vehicle (PHEV).

In FIG. 1, a rear gate for covering a rear end of a vehicle body of the vehicle 10 is omitted for convenience of explanation A rear seat 13 is disposed on a rear side in a vehicle cabin of the vehicle 10, and a rear floor 12 is placed further rearward than the rear seat 13. The battery pack 26, which is not illustrated here but will be described later, is disposed in a housing space 11 under the rear floor 12. The battery pack 26 includes the battery pack cooling system 16, which will be described later.

The disposition of the battery pack 26 and the battery pack cooling system 16 is not limited to the position under the rear floor 12 and may be a position under a front floor (not illustrated) on which a driver's seat and a passenger seat are arranged, or the like.

Figure 2:
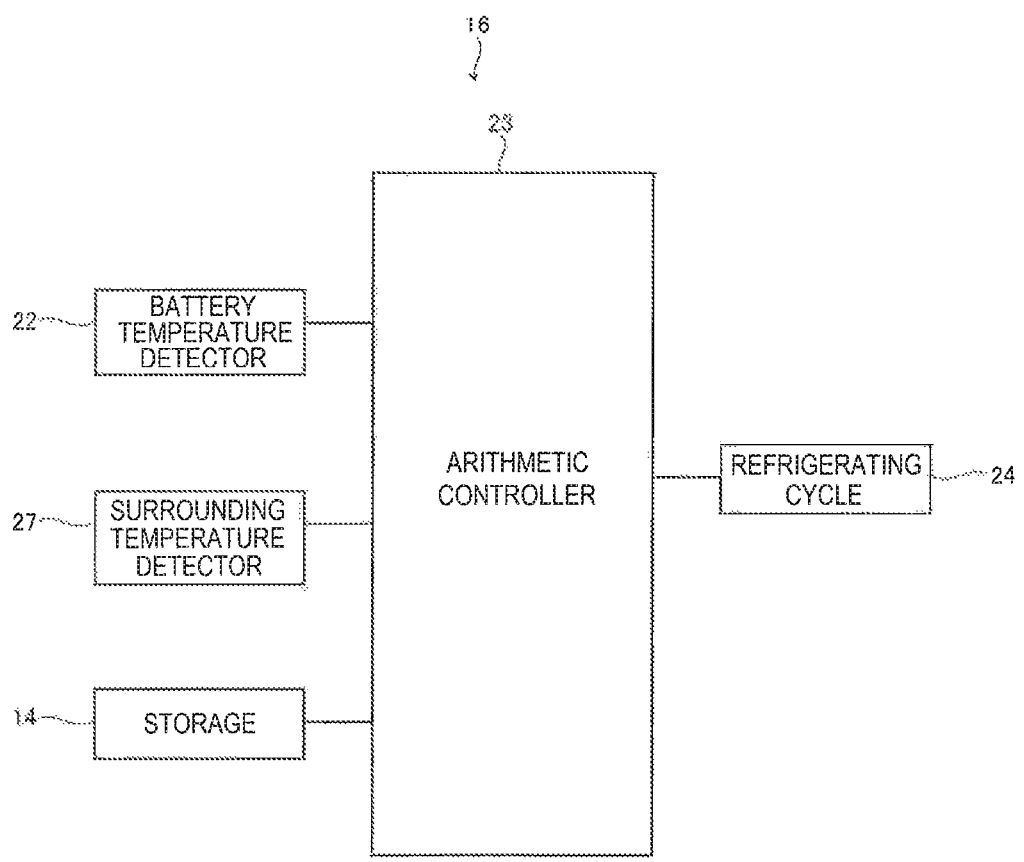
FIG. 2 is a connection diagram illustrating the battery pack cooling system, according to the embodiment of the disclosure.

FIG. 2 is a connection diagram illustrating the battery pack cooling system 16. The battery pack cooling system 16 includes an arithmetic controller 23, a battery temperature detector 22, a surrounding temperature detector 27, a storage 14, and a refrigerating cycle 24.

The arithmetic controller 23 is, for example, a CPU, in which an input terminal is coupled to the battery temperature detector 22, the surrounding temperature detector 27, and the storage 14, whereas an output terminal is coupled to the refrigerating cycle 24. The arithmetic controller 23 controls operation of the refrigerating cycle 24 based on information input from the surrounding temperature detector 27, the battery temperature detector 22, and the storage 14.

The battery temperature detector 22 measures temperature of a battery module 17, which will be described later, and inputs the measured result to the arithmetic controller 23.

The surrounding temperature detector 27 measures temperature surrounding the battery pack 26 or the vehicle 10 and inputs the measured result in the arithmetic controller 23.

The storage 14 is a RAM or a ROM and stores a program, parameters, and other information for operating the battery pack cooling system 16.

The refrigerating cycle 24 is a vapor compression refrigerating cycle for cooling down cooling medium that flows in a cooling medium passage 21, which will be described later. The refrigerating cycle 24 may be constructed as a dedicated device for cooling the battery module 17. Moreover, the refrigerating cycle 24 may also serve as an air conditioner for cooling the vehicle cabin of the vehicle 10.

Figure 3:
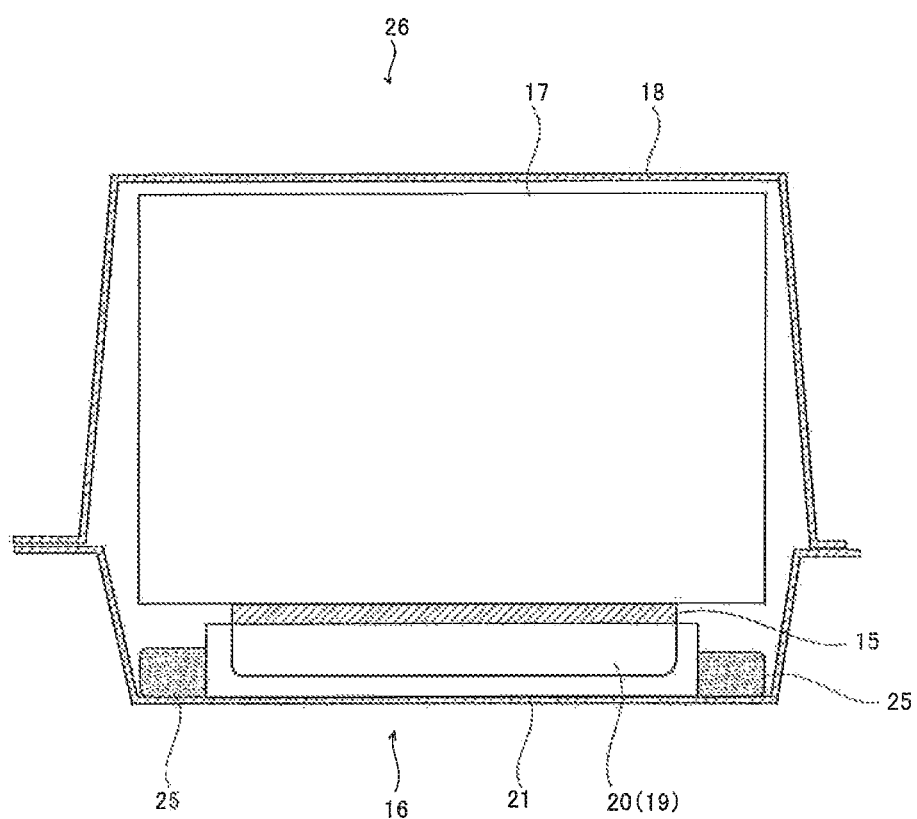
FIG. 3 is a sectional view illustrating the battery pack cooling system according to the embodiment of the disclosure.

FIG. 3 is a sectional view illustrating the battery pack 26 having the battery pack cooling system 16.

The battery pack 26 has a battery pack case 18 that contains the battery module 17 and the battery pack cooling system 16.

The battery module 17 supplies electric current to a motor that provides a driving force to the vehicle body of the vehicle 10. The battery module 17 may be a secondary battery, such as a nickel hydrogen battery or a lithium ion battery. Although not illustrated herein, the battery module 17 is composed of a plurality of battery cells that are arranged in a stacked state.

The battery pack cooling system 16 includes the battery pack case 18, a cooling fluid passage 20, the cooling medium passage 21, and a water absorber 25.

The battery pack case 18 is an approximately box-shaped container for containing the battery module 17. The battery pack case 18 is made of a metal plate or synthetic resin plate formed into a predetermined shape. The battery pack case 18 is almost tightly closed.

The cooling fluid passage 20 is disposed in the vicinity of the battery module 17, through which cooling fluid 19 for cooling the battery module 17 flows. The cooling fluid passage 20 exchanges heat with each battery cell composing the battery module 17. The cooling fluid 19 that circulates in the cooling fluid passage 20 may be a liquid, such as water. Herein, the cooling fluid passage 20 is disposed under the battery module 17.

A heat transfer material 15 may be interposed between the cooling fluid passage 20 and the battery module 17. The heat transfer material 15 is a sheet-shaped member having good heat transfer characteristics and may be, for example, a resin material having a high thermal conductivity or a grease member. Using the heat transfer material 15 facilitates heat exchange between the battery module 17 and the cooling fluid passage 20. The battery pack 26 can be made by omitting the heat transfer material 15.

The cooling medium passage 21 exchanges heat with the cooling fluid 19, which flows in the cooling fluid passage 20. Cooling medium that is used in the vapor compression refrigerating cycle flows through the cooling medium passage 21. The vapor compression refrigerating cycle includes a compressor, a condenser, an expander, and an evaporator, and the cooling medium circulates among these constituent devices. The cooling medium in a low temperature state after passing through the expander, flows through the cooling medium passage 21. This structure makes the cooling medium, which flows in the cooling medium passage 21, exchange heat with the cooling fluid 19, which flows in the cooling fluid passage 20, whereby the cooling fluid 19 is effectively cooled.

As described above, the battery module 17 is cooled by using the cooling fluid passage 20, and moreover, the cooling fluid 19 that flows in the cooling fluid passage is cooled by using the cooling medium passage 21. Thus, the battery module 17 is effectively and uniformly cooled.

The cooling medium passage 21 is disposed in such a manner as to be exposed to a space in the battery pack case 18. In response to the cooling medium flowing through the cooling medium passage 21, the surface temperature of the cooling medium passage 21 is decreased to be lower than the surface temperatures of the battery module 17, the cooling fluid passage 20, and the water absorber 25. That is, the surface temperature of the cooling medium passage 21 is lowest.

The water absorber 25 can absorb water that is condensed on the cooling medium passage 21. Herein, the water absorber 25 is disposed in contact with the cooling medium passage 21. As viewed from above, the water absorber 25 surrounds the cooling medium passage 21. The water absorber 25 may be made of a water absorbable material, such as foam resin or diatomite.

The water absorber 25 is positioned farther from the battery module 17 than the cooling medium passage 21. This structure enables the water that is absorbed by the water absorber 25, to be separated from the battery module 17.

The battery pack cooling system 16 having the above-described structure operates as follows.

First, when the temperature of the battery module 17, which is measured by the battery temperature detector 22, is a predetermined value or higher, for example, 40°C. or higher, the arithmetic controller 23 makes the cooling fluid 19 circulate in the cooling fluid passage 20 by operating a pump, which is not illustrated herein. This causes the cooling fluid 19 to exchange heat with each battery cell that constitutes the battery module 17, whereby the battery module 17 is cooled.

The cooling fluid 19, which absorbs heat from the battery module 17, increases in temperature in the cooling fluid passage 20. In view of this, the arithmetic controller 23 makes the cooling medium flow through the cooling medium passage 21. This operation makes the cooling medium, which flows in the cooling medium passage 21, exchange heat with the cooling fluid 19, which flows in the cooling fluid passage 20, whereby the cooling fluid 19 is cooled. Thus, the cooling medium that flows through the cooling medium passage 21 effectively cools the cooling fluid 19, resulting in effective cooling of the battery module 17.

When the surface temperature of the cooling medium passage 21 is lowered in response to the cooling medium flowing through the cooling medium passage 21, water that is contained in the air in the battery pack case 18 is preferentially condensed on the surface of the cooling medium passage 21. This water condensation on the surface of the cooling medium passage 21 decreases humidity in the battery pack case 18, which prevents water condensation on the surface of the battery module 17, and moreover, prevents occurrence of failure in the battery module due to the water condensation.

The water that is condensed on the surface of the cooling medium passage 21 is absorbed by the water absorber 25. This prevents the water, which is condensed on the cooling medium passage 21, from wetting the battery module 17.

Thereafter, when the temperature of the battery module 17, which is measured by the battery temperature detector 22, becomes lower than a predetermined temperature, for example, lower than 40° C., the arithmetic controller 23 intermits circulation of the cooling fluid 19 in the cooling fluid passage 20 by stopping the pump or by other method. Moreover, flowing of the cooling medium through the cooling medium passage 21 is intermitted.

At this time, in the case in which outside air temperature or other temperature, which is measured by the surrounding temperature detector 27, is such a low temperature as a predetermined value or lower, for example, 0° C. or lower, the arithmetic controller 23 extracts the cooling medium from the cooling medium passage 21. For example, the cooling medium is extracted from the cooling medium passage 21 so that the cooling medium passage 21 will be approximately vacuum, by operating a pump, which is not illustrated, or by other method. This makes the cooling medium passage 21 function as a heat insulation layer for insulating heat between the battery module 17 and the outside, whereby a decrease in temperature of the battery module 17 is prevented.

The flow rate of the cooling fluid 19 in the cooling fluid passage 20 can be regulated by the arithmetic controller 23. In one example, the arithmetic controller 23 increases the flow rate of the cooling fluid 19 to uniform the temperature of the battery module 17. On the other hand, the arithmetic controller 23 decreases the flow rate of the cooling fluid 19 to cool, the battery module 17.

Figure 4A:
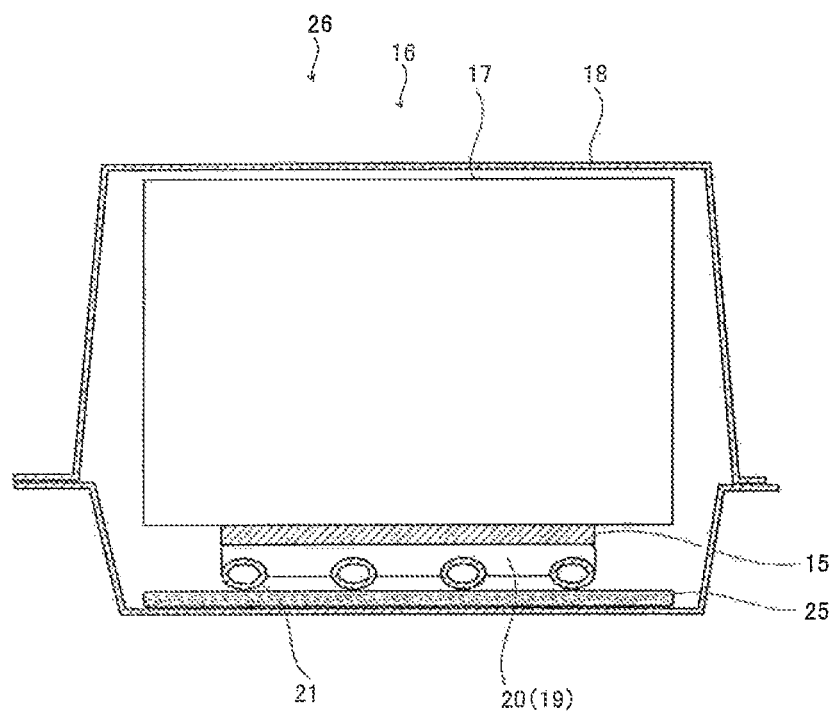
FIGS. 4A and 4B illustrate a battery pack cooling system according to another embodiment of the disclosure.
Figure 4B:
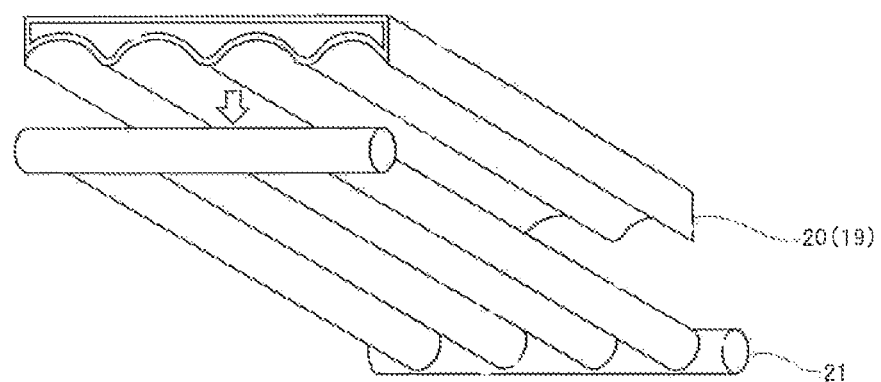

FIGS. 4A and 4B illustrate a battery pack cooling system 16 according to another embodiment of the disclosure. FIG. 4A is a sectional view illustrating a battery pack 26. FIG. 4B is a perspective view simply illustrating a cooling fluid passage 20 and a cooling medium passage 21.

With reference to FIG. 4A, the cooling medium passage 21 is disposed under the cooling fluid passage 20. The cooling medium passage 21 is partially in contact with the air in the battery pack case 18. This structure allows water that is contained in the air in the battery pack case 18, to be condensed on the surface of the cooling medium passage 21, resulting in preventing water condensation on the surface of the battery module 17, as described above.

With reference to FIG. 4B, the cooling fluid passage 20 is formed as a long member being long along the longitudinal direction of the battery module 17, which is a direction in which the battery cells constituting the battery module 17 are stacked. The cooling medium passage 21 extends along the longitudinal direction of the cooling fluid passage 20, which is the direction in which the battery cells constituting the battery module 17 are stacked. This structure reduces the difference in temperature of the cooling fluid 19 in the cooling fluid passage 20, whereby temperature difference of the battery module 17 can be decreased. The cooling fluid passage 20 has a lower uneven surface, and an upper surface of the cooling medium passage 21 is in surface contact with this uneven surface, whereby heat exchange between the cooling fluid passage 20 and the cooling medium passage 21 is accelerated.

The water absorber 25 is disposed on a lower surface of the cooling medium passage 21. This structure enables the water absorber 25 to reliably capture the water condensed on the cooling medium passage 21.

The above-described embodiments of the disclosure provide the following main effects.

In the embodiments of the disclosure, the battery module 17 is cooled by the cooling fluid 19, which flows in the cooling fluid passage 20, and the cooling fluid 19 is cooled by the cooling medium, which flows in the cooling medium passage 21, whereby the battery module 17 is cooled. Moreover, variation in temperature of the battery module 17 is prevented, resulting in preventing charge characteristics and discharge characteristics of the battery module 17 from deteriorating early.

When humidity in the battery pack case 18 is increased, water is condensed on the surface of the cooling medium passage 21, which prevents water condensation on the battery module 17. The water absorber 25, which is disposed in the vicinity of the cooling medium passage 21, absorbs water that is condensed on the cooling medium passage 21, thereby preventing the water from wetting the battery module 17. The battery pack cooling system 16 can be made by omitting a cooling device for cooling the cooling fluid 19, such as a chiller. In addition, the cooling fluid passage 20 and the cooling medium passage 21 are contained in the battery pack case 18, and therefore, the whole structure of the battery pack 26 can be simplified.

In the embodiments of the disclosure, the water absorber 25, which surrounds the cooling medium passage 21, reliably absorbs water that is condensed on the surface of the cooling medium passage 21.

In the embodiments of the disclosure, extracting the cooling medium from the cooling medium passage 21 so that the cooling medium passage 21 will be approximately vacuum, makes the cooling medium passage 21 function as a heat insulation material, whereby the battery module 17 is prevented from being excessively decreased in temperature.

In the embodiments of the disclosure, the water absorber 25, which is positioned farther from the battery module 17 than the cooling medium passage 21, prevents water that is condensed on the cooling medium passage 21, from wetting the battery module 17.

Although the embodiments of the disclosure have been described above, the disclosure is not limited thereto, and various modifications and alterations can be made within the gist of the disclosure. The above-described embodiments can be combined with each other.

With reference to FIG. 3, a heat transfer sheet may be interposed between the cooling fluid passage 20 and the cooling medium passage 21. This structure further facilitates heat dissipation from the battery module 17.

In the embodiments of the disclosure, the battery module is cooled by the cooling fluid, which flows in the cooling fluid passage, and the cooling fluid is cooled by the cooling medium, which flows in the cooling medium passage, whereby the battery module is uniformly cooled. When humidity in the battery pack case is increased, water is condensed on the surface of the cooling medium passage, whereby humidity in the air in the battery pack is reduced, and occurrence of water condensation on the battery module and the cells is prevented. Moreover, the water absorber, which is disposed in the vicinity of the cooling medium passage, absorbs water that is condensed on the cooling medium passage, thereby preventing the water from wetting the battery module and the cells.

The water absorber, which surrounds the cooling medium passage, reliably absorbs water that is condensed on the surface of the cooling medium passage.

Extracting the cooling medium from the cooling medium passage so that the cooling medium passage will be approximately vacuum, makes the cooling medium passage function as a heat insulation material, whereby the battery module is prevented from being excessively decreased in temperature.

The water absorber, which is positioned farther from the battery module than the cooling medium passage, prevents water that is condensed on the cooling medium passage, from wetting the battery module.

The cooling fluid passage is long and thin along the direction in which the battery cells are stacked, and the cooling medium passage extends along the direction in which the battery cells are stacked. This structure enables uniformly cooling the battery cells.

The invention claimed is:

1. A battery pack cooling system comprising:
    a battery pack case housing a battery module;
    a cooling fluid passage through which cooling fluid for cooling the battery module is to flow, the cooling fluid passage disposed in a vicinity of the battery module;
    a cooling medium passage through which cooling medium is to flow, the cooling medium passage configured to exchange heat with the cooling fluid and disposed so as to be exposed to a space in the battery pack case; and
    a water absorber made of a water absorbable material, the water absorber being configured to absorb water that is condensed on the cooling medium passage, and wherein the battery module, the cooling fluid passage, the cooling medium passage and the water absorber are in a stacked arrangement and are all retained within a common, single space region defined by the battery pack case.

2. The battery pack cooling system according to claim 1, wherein the water absorber is disposed so as to surround the cooling medium passage.

3. A battery pack cooling system comprising:
    a battery pack case housing a battery module;
    a cooling fluid passage through which cooling fluid for cooling the battery module is to flow, the cooling fluid passage disposed in a vicinity of the battery module;
    a cooling medium passage through which cooling medium is to flow, the cooling medium passage configured to exchange heat with the cooling fluid and disposed so as to be exposed to a space in the battery pack case;
    a water absorber made of a water absorbable material, the water absorber being configured to absorb water that is condensed on the cooling medium passage;
    a surrounding temperature detector configured to measure a surrounding temperature; and
    an arithmetic controller, and wherein
    the arithmetic controller is configured to, when the surrounding temperature measured by the surrounding temperature detector is a predetermined value or lower, extract the cooling medium from the cooling medium passage.

4. The battery pack cooling system according to claim 2, further comprising:
    a surrounding temperature detector configured to measure a surrounding temperature; and
    an arithmetic controller, wherein
    the arithmetic controller is configured to, when the surrounding temperature measured by the surrounding temperature detector is a predetermined value or lower, extract the cooling medium from the cooling medium passage.

5. The battery pack cooling system according to claim 1, wherein the water absorber is disposed farther from the battery module than the cooling medium passage.

6. The battery pack cooling system according to claim 2, wherein the water absorber is disposed farther from the battery module than the cooling medium passage.

7. The battery pack cooling system according to claim 3, wherein the water absorber is disposed farther from the battery module than the cooling medium passage.

8. The battery pack cooling system according to claim 4, wherein the water absorber is disposed farther from the battery module than the cooling medium passage.

9. The battery pack cooling system according to claim 1, wherein
    the battery module comprises stacked battery cells that are disposed in a stacked state,
    the cooling fluid passage is long and thin along a direction in which the battery cells are stacked, and
    the cooling medium passage extends along the direction in which the battery cells are stacked.

10. The battery pack cooling system according to claim 2, wherein
    the battery module comprises stacked battery cells that are disposed in a stacked state,
    the cooling fluid passage is long and thin along a direction in which the battery cells are stacked, and
    the cooling medium passage extends along the direction in which the battery cells are stacked.

11. The battery pack cooling system according to claim 3, wherein
    the battery module comprises stacked battery cells that are disposed in a stacked state,
    the cooling fluid passage is long and thin along a direction in which the battery cells are stacked, and
    the cooling medium passage extends along the direction in which the battery cells are stacked.

12. The battery pack cooling system according to claim 4, wherein
    the battery module comprises stacked battery cells that are disposed in a stacked state,
    the cooling fluid passage is long and thin along a direction in which the battery cells are stacked, and
    the cooling medium passage extends along the direction in which the battery cells are stacked.

13. The battery pack cooling system according to claim 5, wherein
    the battery module comprises stacked battery cells that are disposed in a stacked state,
    the cooling fluid passage is long and thin along a direction in which the battery cells are stacked, and
    the cooling medium passage extends along the direction in which the battery cells are stacked.

14. The battery pack cooling system according to claim 6, wherein
    the battery module comprises stacked battery cells that are disposed in a stacked state,
    the cooling fluid passage is long and thin along a direction in which the battery cells are stacked, and
    the cooling medium passage extends along the direction in which the battery cells are stacked.

15. The battery pack cooling system according to claim 7, wherein
the battery module comprises stacked battery cells that are disposed in a stacked state,
the cooling fluid passage is long and thin along a direction in which the battery cells are stacked, and
the cooling medium passage extends along the direction in which the battery cells are stacked.

16. The battery pack cooling system according to claim 8, wherein
the battery module comprises stacked battery cells that are disposed in a stacked state,
the cooling fluid passage is long and thin along a direction in which the battery cells are stacked, and
the cooling medium passage extends along the direction in which the battery cells are stacked.

17. The battery pack cooling system according to claim 1, wherein the water absorber is a pad that extends beyond opposite, external most peripheral edges of the cooling medium passage in a direction of cooling fluid flow.

18. The battery pack cooling system of claim 1, further comprising a heat transfer sheet that is retained in the stack as to be in direct contact with a bottom region of the battery module and an upper region of the cooling fluid passage.

19. The battery pack cooling system of claim 1, wherein an underside of the cooling fluid passage includes an uneven lower surface defining a plurality of elongated recesses in which are received, in direct contact, portions of the cooling medium passage.

20. The battery pack cooling system of claim 18, wherein an underside of the cooling fluid passage includes an uneven lower surface defining a plurality of elongated recesses in which are received, in direct contact, portions of the cooling medium passage.

21. A battery pack cooling system comprising:
a battery pack case housing a battery module;
a cooling fluid passage through which cooling fluid for cooling the battery module is to flow, the cooling fluid passage disposed in a vicinity of the battery module;
a cooling medium passage through which cooling medium is to flow, the cooling medium passage configured to exchange heat with the cooling fluid and disposed so as to be exposed to a space in the battery pack case; and
a water absorber made of a water absorbable material, the water absorber being configured to absorb water that is condensed on the cooling medium passage, and wherein the battery module, the cooling fluid passage, the cooling medium passage and the water absorber are in a stacked arrangement in a height direction within the battery case, and wherein each of the cooling fluid passage and the cooling medium passage are more elongated in a direction in common with a direction of cooling fluid flow in the cooling fluid passage than in the height direction.

22. The battery pack cooling system of claim 21, wherein, in the stacked arrangement, the cooling medium passage has a maximum vertical length that is less than a maximum vertical length of the battery module.

23. The battery pack cooling system of claim 21 wherein, relative to the stacked arrangement, the cooling medium passage and the cooling fluid passage are in a nested arrangement as to occupy, in combination, less vertical height length than the battery module vertical height length.

* * * * *